Patented June 8, 1954

2,680,732

UNITED STATES PATENT OFFICE 2,680,732

ACETALS CONTAINING A CYANOACETYL GROUP

Elmore Louis Martin, Wilmington, Del., assignor to E. I. du Pont de Nemours and Company, Wilmington, Del., a corporation of Delaware No Drawing. Application October 31, 1950, Serial No. 193,297

7 Claims. (Cl. 260—66)

This invention relates to a new class of acetals of monohydric and polyhydric alcohols with aldehydes which are aromatic in character. More particularly, it relates to new color-forming acetals of monohydric and polyhydric alcohols with aromatic and heterocyclic aldehydes which contain a cyanoacetyl substituent. The invention also relates to photographic silver halide dispersions embodying such acetals.

Polyhydric alcohol acetals of various derivatives of m-aminobenzaldehyde have been proposed heretofore for use in color photography. For example, outstanding magenta color-formers containing the acetalized m-aminobenzaldehyde nucleus are described in U. S. Patents 2,472,911; 2,476,988, and 2,489,655. It has now been found that superior magenta color-formers, giving exceptionally good subtractive color images in color-coupling development processes of color photography, can be obtained from simpler molecules not containing the m-aminobenzaldehyde nucleus, which fact is quite surprising.

The new products of this invention are the monohydric and the polyhydric alcohol acetals of cyanoacetyl aldehydes of the formula

OHC—R—CO—CH$_2$—CN wherein R is a divalent radical, aromatic in character, whose terminal atoms are carbon, and photographic silver halide dispersions embodying these acetals.

In the new acetals defined above, the alcohol portion of the molecule, i. e., the portion acetalized with the cyanoacetylaryl aldehyde is either a monomeric alcohol preferably an alcohol of 1 to 4 carbon atoms, e. g., ethyl, methyl, propyl, isobutyl, etc., and more preferably a monomeric 1,2- or 1,3-alkanediol of 2 to 4 carbon atoms, or a hydroxyl polymer which is water soluble or hydrophilic in character, has a molecular weight in excess of about 10,000 and contains a large number of recurring intralinear

groups, e. g., polyvinyl alcohol itself, or a partly hydrolyzed vinyl ester, or a hydrolyzed interpolymer of vinyl esters with minor proportions of other vinyl compounds. The acetals of monomeric polyhydric alcohols may be used as such in photographic emulsions or dispersions containing a water-permeable colloid binding agent for the silver halide grains, e. g., gelatin, or they may be used as intermediates in the preparation of the acetals of polymeric vinyl alcohols, the latter being used in photographic emulsions as both the color-former and the colloid binding agent for the light-sensitive silver salts binder.

The radical R in the above formula may be any divalent cyclic radical having aromatic properties. Thus, it can be an arylene or substituted arylene radical or a heterocyclic radical which is aromatic in character, the latter forming a well-recognized chemical class (see, for example, Whitmore's "Organic Chemistry," pages 874–875, published by D. Van Nostrand and Company, New York, N. Y. 1937).

The compounds of this invention may be prepared by various methods. One method, illustrated in the examples which follow, comprises the following steps: (1) halomethylating an alkyl ester of an aromatic carboxylic acid to give an alkyl ester of a halomethylaryl carboxylic acid (I); (2) reacting (I) with 2-nitropropane in the presence of a condensing agent to replace the halomethyl group by the aldehyde group, thus giving a carboalkoxyaryl aldehyde (II) (see Hass and Bender, J. Am. Chem. Soc., 71, 1767 (1949)); (3) acetalizing (II) with a monomeric alcohol (monohydric or polyhydric) to give the corresponding acetal of a carboalkoxyaryl aldehyde (III); (4) reacting (III) with acetonitrile in the presence of a condensing agent to replace the carboalkoxy group by the cyanoacetyl group, thus giving a monomeric acetal of a cyanoacetylaryl aldehyde (IV). If the acetal so obtained is that of a monohydric alcohol, it may then be converted to that of a polyhydric alcohol (monomeric or polymeric) by acetal interchange with the desired alcohol, e. g., ethylene glycol or polyvinyl alcohol. The lower dihydric alcohol acetals, e. g., the ethylene glycol acetal can be similarly converted to a higher acetal, e. g., a polyvinyl acetal by acetal interchange. The above steps are shown schematically by the following equations, using methyl furoate and ethylene glycol as illustrative reactants:

1.
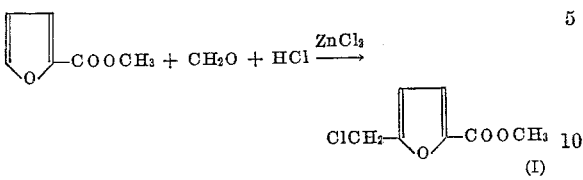

2.
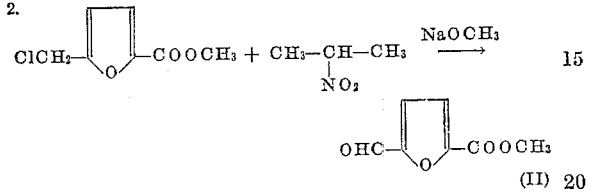

3.
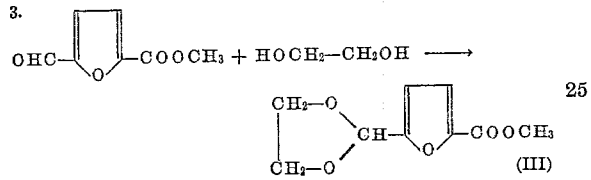

4.
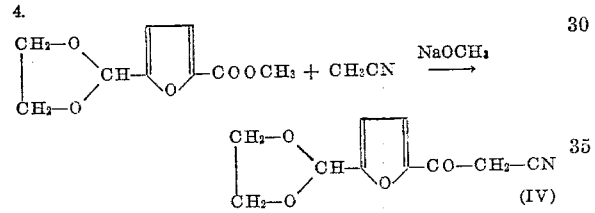

The invention is illustrated in greater detail by the following examples, in which parts are by weight unless otherwise noted.

EXAMPLE I

A. *Methyl 5-chloromethylfuroate*

Through a stirred mixture of 106 parts of methyl furoate, 26 parts of paraformaldehyde, 30 parts of anhydrous zinc chloride and 268 parts of methylene chloride was passed dry hydrogen chloride. The temperature was maintained at 30–33° C. by means of external cooling until the exothermic reaction had ceased. The passage of hydrogen chloride was continued for an additional period of 2 hours. The mixture was poured onto ice, the organic layer was separated, washed with (1) water, (2) sodium bicarbonate solution, (3) water and after drying was concentrated. Distillation of the residue gave 126 parts of methyl 5-chloromethylfuroate boiling at 116–117° C. at 2 mm.

B. *5-carbomethoxy-2-furaldehyde*

To a solution of 17 parts of sodium in 225 parts of methanol there was added 63 parts of 2-nitropropane followed by the addition of 126 parts of methyl 5-chloromethylfuroate. The mixture was refluxed for 3 hours, the methanol was removed by distillation, and the residue was distilled under reduced pressure. There was obtained 42 parts of 5-carbomethoxy-2-furaldehyde boiling at 120–125° C. at 2 mm. The distillate slowly solidified on standing.

C. *5-carbomethoxy-2-furaldehyde ethylene glycol acetal*

A mixture of 42 parts of 5-carbomethoxy-2-furaldehyde, 19 parts of ethylene glycol, and 200 parts of xylene was heated to a gentle reflux and the water allowed to distill from the reaction mixture. After about 1 hour, the theoretical amount of water had distilled and the residue was fractionated under reduced pressure. There was obtained 32 parts of 5-carbomethoxy-2-furaldehyde ethylene glycol acetal boiling at 125–130° C. at 2 mm.

D. *5-cyanoacetyl-2-furaldehyde ethylene glycol acetal*

A mixture of 30 parts of 5-carbomethoxy-2-furaldehyde ethylene glycol acetal, 10 parts of sodium methylate, and 50 parts of acetonitrile was refluxed for 1 hour. The resulting reaction mixture was diluted with 500 parts of cold water, and the reaction product was precipitated by the addition of 28% acetic acid. The 5-cyanoacetyl-2-furaldehyde ethylene glycol acetal was collected, washed with water, and crystallized repeatedly from methylene chloride-ether. The colorless crystals melted at 86–88° C. This product has the formula

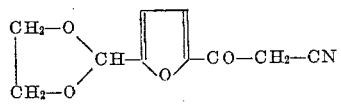

Analysis:
Calcd. for $C_{10}H_9O_4N$ ---- C, 57.94; H, 4.38; N, 6.77
Found ---------------- C, 58.12; H, 4.67; N, 6.84

E. *5-cyanoacetyl-2-furaldehyde polyvinyl acetal*

A mixture of 10 parts of polyvinyl alcohol, 1.65 parts of 5-cyanoacetyl-2-furaldehyde ethylene glycol acetal, 0.2 part of o-sulfobenzaldehyde sodium salt, 65 parts of ethylene glycol, and 0.8 part of 92% phosphoric acid was stirred at 66° C. for 2 hours. The reaction mixture was cooled to 25° C. and then diluted with 150 parts of methanol. The polyvinyl acetal was collected, washed with methanol, and slurried for 5 minutes with methanol, then filtered, washed again with methanol, and slurried a second time for 10 minutes with methanol. The polyvinyl acetal was collected and air dried. It was a colorless solid readily soluble in aqueous ethanol.

F. *Photographic emulsion using 5-cyanoacetyl-2-furaldehyde polyvinyl acetal*

A mixture of 10 parts of 5-cyanoacetyl-2-furaldehyde polyvinyl acetal, 40 parts of ethanol, 150 parts of water, and 0.5 part of a 10% solution of sodium carbonate was stirred at 70–75° C. for 10 minutes. The resulting homogeneous solution was cooled to room temperature and used to prepare a silver halide emulsion under such conditions as to prevent exposure or fogging of the sensitive silver salts as follows:

To 90 parts of the above solution there was added 20 parts of ethanol and to the resulting solution there were added simultaneously and at essentially equivalent rates a solution of 31 parts of 3 N ammonium bromide, and 2 parts of 0.5 N potassium iodide in 32 parts of water together with a solution of 29 parts of 3 N silver nitrate, 25 parts of 20% ammonium hydroxide, and 7 parts of water during the course of 10 minutes. After stirring for a total of ½ hour, the emulsion was run into 250 parts of a 15% aqueous sodium sulfate solution. The precipitated silver halide-color-former emulsion was pressed into a thin sheet, cut into small pieces and washed for 1 hour in running water, after which the excess water was drained off. A mixture of 25 parts of ethanol and 25 parts of water was added, and the mixture was stirred at 70–75°

C. for 10 minutes. The remainder of the original solution was added and the stirring continued for an additional period of 10 minutes. After cooling to 25° C., the emulsion was coated on film base, the resulting photographic film was exposed and then developed in a solution made by admixing the following components:

| | Grams |
|---|---|
| p-Aminodiethylaniline hydrochloride | 2.5 |
| Sodium sulfite (anhydrous) | 2.0 |
| Sodium carbonate (monohydrate) | 20.0 |
| Potassium bromide | 2.0 |
| Water to make 1000 cc. | |

The film was fixed in 25% sodium thiosulfate, washed, bleached in 4% potassium ferricyanide, washed, fixed in 25% sodium thiosulfate, and washed. The resulting film gave a bright magenta negative dye image.

EXAMPLE II

A. Methyl 4-bromomethylbenzoate

A mixture of 475 parts of p-toluic acid and 500 parts of thionyl chloride was refluxed gently until the evolution of sulfur dioxide and hydrogen chloride was complete. The mixture was distilled under reduced pressure, and the fraction boiling at 107° C. at 17 mm. was the desired p-toluylchloride. To 155 parts of the p-toluylchloride heated to 125° C. was added slowly 175 parts of bromine during the course of 2 hours. The mixture was heated for an additional period of 1 hour, and then the reaction product was distilled under reduced pressure. There was obtained 230 parts of 4-bromomethylbenzoyl chloride, B. P. 145–150° C. at 2 mm. To 500 parts of methanol was added slowly 230 parts of the above 4-bromomethylbenzoyl chloride and the resulting solution distilled under reduced pressure. There was obtained 166 parts of methyl 4-bromomethylbenzoate, B. P. 130–135° C. at 2 mm. The molten ester was poured into excess cold petroleum ether and, after cooling to —30° C., the colorless crystals (152 parts) were collected, washed with cold petroleum ether, and dried.

B. 4-carbomethoxybenzaldehyde

To a solution of 4.6 parts of sodium in 150 parts of methanol there was added 20 parts of 2-nitropropane followed by the addition of 45 parts of methyl 4-bromomethylbenzoate. The resulting reaction mixture was refluxed for 2 hours, and the methanol was removed by distillation. The residue was diluted with water and the mixture extracted with methylene chloride. Concentration of the methylene chloride extract and distillation of the residue gave 24 parts of 4-carbomethoxybenzaldehyde, B. P. 110–115° C. at 2 mm.

C. 4-carbomethoxybenzaldehyde ethylene glycol acetal

A mixture of 74 parts of 4-carbomethoxybenzaldehyde, 31 parts of ethylene glycol, 200 parts of xylene and 0.1 part of 92% phosphoric acid was refluxed gently, the water of reaction being allowed to distill. After about 1 hour, the theoretical amount of water had been collected, and the residue was poured onto ice and water containing 5 parts of sodium bicarbonate. The organic layer was separated, washed, dried, and distilled under reduced pressure. There was obtained 74 parts of 4-carbomethoxybenzaldehyde ethylene glycol acetal, B. P. 130–135° C. at 1. mm.

D. 4-cyanoacetylbenzaldehyde ethylene glycol acetal

A mixture of 44 parts of 4-carbomethoxybenzaldehyde ethylene glycol acetal, 30 parts of sodium methylate, and 100 parts of acetonitrile was refluxed for four hours. The reaction mixture was diluted with 1000 parts of cold water, and the reaction product was precipitated from the resulting solution by the addition of acetic acid. Crystallization of the crude 4-cyanoacetylbenzaldehyde ethylene glycol acetal from methylene chloride-ether gave 20 parts of colorless crystals, M. P. 115–117° C. This product has the formula

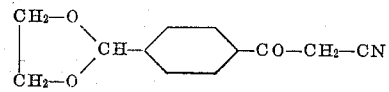

Analysis:
Calcd. for $C_{12}H_{11}O_3N$ _____ C, 66.33; H, 5.11; N, 6.45
Found _____ C, 66.41; H, 5.38; N, 6.40

E. 4-cyanoacetylbenzaldehyde polyvinyl acetal

A mixture of 10 parts of polyvinyl alcohol, 2 parts of 4-cyanoacetylbenzaldehyde ethylene glycol acetal, 0.45 part of o-sulfobenzaldehyde sodium salt, 70 parts of ethylene glycol, and 0.9 part of 92% phosphoric acid was stirred at 65° C. for 3 hours. The polyvinyl acetal was isolated essentially as described in Example I, section E.

F. Photographic emulsion using 4-cyanoacetylbenzaldehyde polyvinyl acetal

Two hundred (200) parts of a 5% solution of 4-cyanoacetylbenzaldehyde polyvinyl acetal was prepared essentially as described in Example I, Section F. A silver halide emulsion was prepared, coagulated, washed, redispersed, and coated on film base essentially as described in Example I, section F. The processed film gave a strong magenta negative dye image.

EXAMPLE III

A. Methyl 5-chloromethylbenzofuran-2-carboxylate

Through a stirred mixture of 106 parts of methyl benzofuran-2-carboxylate, B. P. 120–125° C. at 1 mm., prepared by the esterification of benzofuran-2-carboxylic acid (coumarilic acid; see "Organic Synthesis," volume 24, p. 33, for the preparation of coumarilic acid) with methanol and sulfuric acid, 22 parts of paraformaldehyde, 20 parts of anhydrous zinc chloride, and 325 parts of chloroform was passed rapidly dry hydrogen chloride. The temperature was allowed to increase to 50° C. and maintained at this temperature for 1 hour after the exothermic reaction had ceased. The two layers were separated, the organic layer was washed with 5 changes of water, dried, and concentrated. Distillation of the residue gave 105 parts of methyl 5-chloromethylbenzofuran-2-carboxylate boiling at 160–170° C., mainly 165° C., at 1 mm.

B. 2-carbomethoxy-5-benzofuraldehyde

To a solution of 22 parts of sodium in 300 parts of methanol was added 83 parts of 2-nitropropane followed by the addition of a solution of 204 parts of methyl 5-chloromethylbenzofuran-2-carboxylate in 200 parts of methanol. The resulting mixture was refluxed for 2 hours, and the methanol was removed by distillation. Working up the residue gave 126 parts of 2-carbomethoxy-5-benzofuraldehyde boiling at 165–170° C. at 1 mm.

C. 2-carbomethoxy-5-benzofuraldehyde ethylene glycol acetal

A mechanically stirred mixture of 106 parts of 2-carbomethoxy-5-benzofuraldehyde, 45 parts of ethylene glycol, and 300 parts of xylene was heated to gentle reflux and the water formed during the formation of the acetal allowed to distill. After about 1.5 hours, the theoretical amount of water had been collected. The mixture was then subjected to distillation under reduced pressure. The 2-carbomethoxy-5-benzofuraldehyde ethylene glycol acetal (106 parts) boiled at 175–180° C. at 1 mm.

D. 2-cyanoacetyl-5-benzofuraldehyde ethylene glycol acetal

A mixture of 106 parts of 2-carbomethoxy-5-benzofuraldehyde ethylene glycol acetal, 45 parts of sodium methylate, and 150 parts of acetonitrile was refluxed for 2 hours. The reaction mixture was diluted with water and the reaction product precipitated from the resulting solution by the addition of acetic acid. Crystallization of the crude 2-cyanoacetyl-5-benzofuraldehyde ethylene glycol acetal from methylene chloride gave 35 parts of faintly yellow crystals which were crystallized from acetone to give colorless crystals melting at 183–185° C. with decomposition. This product has the formula

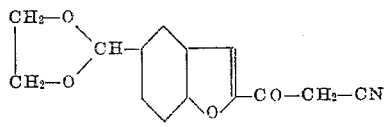

Analysis:
Calcd. for $C_{14}H_{11}O_4N$ ------ C, 65.34; H, 4.31; N, 5.45
Found ------------------ C, 65.55; H, 4.33; N, 5.45

E. 2-cyanoacetyl-5-benzofuraldehyde polyvinyl acetal

A mixture of 10 parts of polyvinyl alcohol, 2 parts of 2-cyanoacetyl-5-benzofuraldehyde ethylene glycol acetal, 0.4 part of o-sulfobenzaldehyde sodium salt, 65 parts of ethylene glycol, 7 parts of dioxane, and 0.9 part of 92% phosphoric acid was stirred at 65° C. for 1 hour. The polyvinyl acetal was isolated essentially as described in Example I, section E.

F. Photographic emulsion using 2-cyanoacetyl-5-benzofuraldehyde polyvinyl acetal Two hundred (200) parts of a 5% solution of 2-cyanoacetyl-5-benzofuraldehyde polyvinyl acetal was prepared essentially as described in Example I, section F. A silver halide emulsion was prepared, coagulated, washed, redispersed, and coated on film base essentially as described in Example I, section F. The processed film gave a beautiful, strong magenta negative dye image.

EXAMPLE IV

A. 2-carbomethoxy-5-benzofuraldehyde dimethyl acetal

A mixture of 148 parts of 2-carbomethoxy-5-benzofuraldehyde prepared as in Example III, 90 parts of dimethyl sulfite, 100 parts of methanol, and 3 parts of thionyl chloride was refluxed gently for a period of 20 hours. The reaction mixture was distilled under reduced pressure. The 2-carbomethoxy-5-benzofuraldehyde dimethyl acetal (152 parts) boiled at 160–165° C. at 1 mm.

B. 2-cyanoacetyl-5-benzofuraldehyde dimethyl acetal

A mechanically stirred mixture of 104 parts of 2-carbomethoxy-5-benzofuraldehyde dimethyl acetal, 30 parts of sodium methylate, 50 parts of acetonitrile, and 25 parts of dioxane was refluxed gently for one-half hour. After cooling, the reaction mixture was diluted with 800 parts of cold water and the reaction product precipitated by the addition of acetic acid. The crude 2-cyanoacetyl-5-benzofuraldehyde dimethyl acetal was collected and washed with water. Three crystallizations from methylene chloride-ether gave colorless crystals, M. P. 100–102° C. with decomposition. This product has the formula

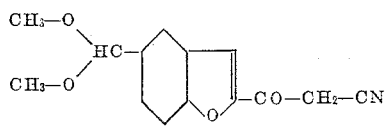

Analysis:
Calcd. for $C_{14}H_{13}O_4N$ ------ C, 64.84; H, 5.06; N, 5.41
Found ------------------ C, 64.94; H, 5.29; N, 5.59

C. 2-cyanoacetyl-5-benzofuraldehyde polyvinyl acetal

To a mechanically stirred mixture of 10 parts of polyvinyl alcohol, 0.15 part of o-sulfobenzaldehyde sodium salt, 0.3 part of p-toluenesulfonic acid monohydrate, and 60 parts of ethylene glycol at 60° C. was added dropwise during the course of 4 minutes a solution of 2 parts of 2-cyanoacetyl-5-benzofuraldehyde dimethyl acetal in 6 parts of dioxane. The stirring was continued at 60° C. for an additional period of 5 minutes after the addition of the acetal was complete. A solution of 0.14 part of triethylamine in 10 parts of methanol was added, the resulting mixture was cooled to 20° C. and then diluted with 100 parts of methanol. The polyvinyl acetal was collected, washed with methanol, slurried with two changes of methanol, and finally slurried with acetone. After drying, there was obtained 11.1 parts of 2-cyanoacetyl-5-benzofuraldehyde polyvinyl acetal. This sample of polyvinyl acetal was similar to the sample prepared as described in Example III, section E. It was used to prepare a silver halide emulsion essentially as described in Example III, section F. The processed film gave a strong magenta negative dye image.

EXAMPLE V

A. Methyl 5 - chloromethyl - 3 - methylbenzofuran-2-carboxylate

Into a mechanically stirred mixture of 278 parts of methyl 3-methylbenzofuran-2-carboxylate (prepared by the esterification of 3-methylbenzofuran-2-carboxylic acid, see Hantzsch, Ber. 19, 1292 (1886), with methanol and sulfuric acid, B. P. 130–135° C. at 1 mm.; M. P. 70–71° C.), 54 parts of paraformaldehyde, 49 parts of anhydrous zinc chloride, and 700 parts of chloroform was passed rapidly dry hydrogen chloride. The temperature was maintained at 50° C. by means of external cooling until the exothermic reaction had ceased. The mixture was then maintained at 50° C. for an additional period of 1.5 hours. After pouring onto ice and water, the organic layer was separated, washed three times with dilute hydrochloric acid, and with water. After drying, the solution was concentrated on a steam bath under reduced pressure. The concentrate (360 parts) was diluted with 400 parts of methanol whereupon crystals of the methyl 5-chloromethyl-3-methylbenzofuran-2-carboxylate separated. After cooling to 0° C., the crystals were collected, washed with a small amount of cold methanol, cold ether, and finally with petroleum ether. The yield of colorless crystals melting at 111–112° C. was 208 parts.

Analysis:
    Calcd. for $C_{12}H_{11}O_3Cl$____ C, 60.38; H, 4.65; Cl, 14.86
    Found _____ C, 60.44; H, 4.77; Cl, 15.10

B. *2 - carbomethoxy - 3 - methyl - 5 - benzofuraldehyde*

To a solution of 6.9 parts of sodium in 100 parts of methanol there was added 30 parts of 2-nitropropane followed by the addition of a solution of 72 parts of methyl 5-chloromethyl-3-methylbenzofuran-2-carboxylate in 500 parts of methanol. The resulting mixture was refluxed for 2 hours. The methanol was removed by distillation during which time the aldehyde separated in crystalline form. After dilution with water, the crude aldehyde was collected, washed with water, cold methanol, cold ether, and finally with petroleum ether. The yield of colorless 2-carbomethoxy - 3 - methyl - 5 - benzofuraldehyde was 55 parts. Crystallization from methanol gave colorless crystals, M. P. 141–142.5° C.

Analysis:
    Calcd. for $C_{14}H_{16}O_5$_____ C, 63.61; H, 6.11
    Found _____ C, 63.86; H, 6.11

C. *2 - carbomethoxy - 3 - methyl - 5 - benzofuraldehyde dimethyl acetal*

A mixture of 55 parts of 2-carbomethoxy-3-methyl-5-benzofuraldehyde, 55 parts of dimethyl sulfite, 150 parts of methanol, and 3 parts of thionyl chloride was refluxed gently for a period of 20 hours. Distillation under reduced pressure gave 60 parts of 2-carbomethoxy-3-methyl-5-benzofuraldehyde dimethyl acetal, B. P. 155° C. at 0.5 mm.

Analysis:
    Calcd. for $C_{12}H_{10}O_4$_____ C, 66.02; H, 4.62
    Found _____ C, 65.94; H, 4.76

D. *2 - cyanoacetyl - 3 - methyl - 5 - benzofuraldehyde dimethyl acetal*

A mixture of 60 parts of 2-carbomethoxy-3-methyl-5-benzofuraldehyde dimethyl acetal, 15 parts of sodium methylate, and 50 parts of acetonitrile was stirred at 65–70° C. for 1.5 hours. After cooling, 500 parts of cold water was added, and the reaction product was precipitated from the resulting solution by the addition of acetic acid. The crude 2-cyanoacetyl-3-methyl-5-benzofuraldehyde dimethyl acetal was collected, washed with water, and crystallized from methylene chloride-ether. The yield was 44 parts. Two additional crystallizations from methylene chloride-ether gave beautiful glistening plates, M. P. 120–122° C. This product has the formula

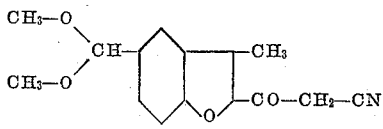

Analysis:
    Calcd. for $C_{15}H_{15}O_4N$_____ C, 65.91; H, 5.54; N, 5.13
    Found _____ C, 65.96; H, 5.48; N, 5.42

E. *2 - cyanoacetyl - 3 - methyl - 5 - benzofuraldehyde polyvinyl acetal*

To a mechanically stirred mixture of 10 parts of polyvinyl alcohol, 0.15 part of o-sulfobenzaldehyde sodium salt, 0.3 part of p-toluenesulfonic acid monohydrate, and 60 parts of ethylene glycol at 60° C. was added dropwise during the course of 6 minutes a solution of 2 parts of 2-cyanoacetyl - 3 - methyl - 5 - benzofuraldehyde dimethyl acetal in 6 parts of dioxane. The stirring at 60° C. was continued for an additional period of 8 minutes, the reaction mixture was cooled to 25° C., and a solution of 0.14 part of triethylamine in 20 parts of methanol was added. After dilution with an additional 100 parts of methanol, the polyvinyl acetal was collected, washed with methanol, and isolated essentially as described in Example I, section E.

F. *Photographic emulsion using 2-cyanoacetyl-3-methyl-5-benzofuraldehyde polyvinyl acetal*

Two hundred (200) parts of a 5% solution of 2 - cyanoacetyl - 3 - methyl - 5 - benzofuraldehyde polyvinyl acetal was prepared essentially as described in Example I, section F. A silver halide emulsion was prepared, coagulated, washed, redispersed, and coated on film base essentially as described in Example I, section F. The processed film gave a beautiful, strong magenta negative dye image.

EXAMPLE VI

A. *Ethyl 5-methyl-3-phenylbenzofuran-2-carboxylate*

To a suspension of 262 parts of the sodium salt of p-cresol in 1000 parts of benzene there was added a solution of 453 parts of ethyl α-chlorobenzoylacetate in 400 parts of benzene. The resulting reaction mixture was heated on a steam bath with stirring for 3 hours and then 1000 parts of water was added. The organic layer was separated, dried and the benzene distilled on a steam bath under reduced pressure. The residue, (600 parts) of crude ethyl α-(p-cresoxy)-benzoylacetate, was added dropwise to 1650 parts of concentrated sulfuric acid, the temperature being maintained at 0–5° C. by means of external cooling. After stirring for an additional period of 1 hour at 5° C., the reaction mixture was poured onto excess ice and the reaction product was extracted with benzene. The benzene solution of the ethyl 5-methyl-3-phenylbenzofuran-2-carboxylate was washed with sodium bicarbonate solution until neutral, then dried and the benzene was removed by distillation under reduced pressure. There was obtained 370 parts of ethyl 5-methyl-3-phenylbenzofuran-2-carboxylate, B. P. 185–190° C. at 2 mm. Crystallization from petroleum ether gave colorless crystals, M. P. 85–87° C.

Analysis:
    Calcd. for $C_{18}H_{16}O_3$_____ C, 77.12; H, 5.76
    Found_____ C, 77.40; H, 5.78

B. *5-methyl-3-phenylbenzofuran-2-carboxylic acid*

To a solution of 370 parts of ethyl 5-methyl-3-phenylbenzofuran-2-carboxylate in 500 parts of ethanol heated to reflux there was added a solution of 85 parts of potassium hydroxide in 200 parts of water. The resulting solution was heated for 0.5 hour, and then acidified with hydrochloric acid. The crude 5-methyl-3-phenylbenzofuran-2-carboxylic acid was collected, washed with water and purified by crystallization from ethanol. The colorless needles melt at 227–228° C.

Analysis:
    Calcd. for $C_{16}H_{12}O_3$_____ C, 76.16; H, 4.80
    Found_____ C, 76.10; H, 4.94

C. 5-methyl-3-phenylbenzofuran-2-carboxylic acid chloride

To 400 parts of thionyl chloride heated to gentle reflux there was added 300 parts of 5-methyl-3-phenylbenzofuran-2-carboxylic acid. The stirring was continued until the evolution of hydrogen chloride and sulfur dioxide had ceased and a homogeneous solution was obtained. The excess thionyl chloride was distilled under reduced pressure. The acid chloride boiled at 180–185° C. at 1 mm. and the distillate solidified on cooling, M. P. 91–93° C.

Analysis:
Calcd. for $C_{16}H_{11}O_2Cl$ _____ Cl, 13.10
Found _____ Cl, 13.09

D. Methyl 5-bromomethyl-3-phenylbenzofuran-2-carboxylate

A solution of 162 parts of 5-methyl-3-phenylbenzofuran-2-carboxylic acid chloride in 100 parts of chlorobenzene was heated to 130° C. and 96 parts of bromine was added to the stirred solution during the course of 2 hours. The chlorobenzene was removed by distillation under reduced pressure and the residual 5-bromomethyl-3-phenylbenzofuran-2-carboxylic acid chloride was added to 200 parts of methanol. After cooling, the crystalline methyl 5-bromomethyl-3-phenylbenzofuran-2-carboxylate was collected and purified by crystallization from methylene chloride-ether mixture. The compound melted at 125–127° C.

Analysis:
Calcd. for $C_{17}H_{13}O_3Br$ ___ C, 59.13; H, 3.80; Br, 23.16
Found _____ C, 59.37; H, 3.94; Br, 23.27

E. 2-carbomethoxy-3-phenyl-5-benzofuraldehyde

To a solution of 3.9 parts of sodium in 160 parts of methanol there was added 16 parts of 2-nitropropane followed by an addition of 56 parts of methyl 5-bromomethyl-3-phenylbenzofuran-2-carboxylate. The resulting mixture was refluxed for 2 hours and then most of the methanol was distilled. After cooling, the reaction mixture was diluted with water, collected, washed with water, methanol and ether. The crystalline reaction product gave colorless crystals of 2-carbomethoxy-3-phenyl-5-benzofuraldehyde, M. P. 153–153.5° C., on crystallization from methanol.

Analysis:
Calcd. for $C_{17}H_{12}O_4$ _____ C, 72.83; H, 4.32
Found _____ C, 72.86; H, 4.51

F. 2-carbomethoxy-3-phenyl-5-benzofuraldehyde dimethyl acetal

To a suspension of 280 grams of 2-carbomethoxy-3-phenyl-5-benzofuraldehyde in 240 parts of methanol and 130 parts of dimethyl sulfite was added 3 parts of thionyl chloride. The reaction mixture was refluxed for 20 hours and then the excess methanol and dimethyl sulfite were distilled under reduced pressure. The 2-carbomethoxy-3-phenyl-5-benzofuraldehyde dimethyl acetal boiled at 195–200° C. at 1 mm.

Analysis:
Calcd. for $C_{19}H_{18}O_5$ _____ C, 69.92; H, 5.83
Found _____ C, 70.05; H, 5.53

G. 2-cyanoacetyl-3-phenyl-5-benzofuraldehyde dimethyl acetal

To a solution of 251 parts of 2-carbomethoxy-3-phenyl-5-benzofuraldehyde dimethyl acetal in 200 parts of acetonitrile there was added 90 parts of sodium methylate. The resulting mixture was stirred at 70–75° C. for 45 minutes and then diluted with 1000 parts of cold water. The resulting solution was acidified with acetic acid and the precipitated 2-cyanoacetyl-3-phenyl-5-benzofuraldehyde dimethyl acetal was collected and crystallized repeatedly from methylene chloride-ether mixture. The colorless crystals melted at 141–142° C. The compound has the formula:

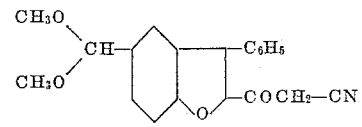

Analysis:
Calcd. for $C_{20}H_{17}O_4N$ _____ C, 71.62; H, 5.11; N, 4.18
Found _____ C, 71.88; H, 5.26; N, 4.16

H. 2-cyanoacetyl-3-phenyl-5-benzofuraldehyde polyvinyl acetal

To 650 parts of ethylene glycol heated to 70° C. there was added 1.2 parts of o-sulfobenzaldehyde sodium salt, 3 parts of p-toluenesulfonic acid monohydrate and 100 parts of polyvinyl alcohol. The resulting suspension was stirred at 65° C. for 15 minutes and a solution of 20 parts of 2-cyanoacetyl-3-phenyl-5-benzofuraldehyde dimethyl acetal in 70 parts of dioxane was added dropwise during the course of 10 minutes. The reaction mixture was stirred for an additional period of 5 minutes, then cooled to 40° C. during the course of 2 minutes and a solution of 1.4 parts of triethylamine in 200 parts of methanol was added rapidly. The mixture was diluted with 1500 parts of methanol and the polyvinyl acetal was isolated essentially as described in Example I, section E. There was obtained 115 parts of colorless 2-cyanoacetyl-3-phenyl-5-benzofuraldehyde polyvinyl acetal which was readily soluble in aqueous ethanol.

I. Photographic emulsion using 2-cyanoacetyl-3-phenyl-5-benzofuraldehyde polyvinyl acetal Two hundred (200) parts of a 5% solution of 2-cyanoacetyl-3-phenyl-5-benzofuraldehyde polyvinyl acetal was prepared essentially as described in Example I, section F. A silver halide emulsion was prepared, coagulated, washed, redispersed and coated on film base essentially as described in Example I, section F. The processed (exposed, developed and fixed) film gave a beautiful magenta negative dye image.

EXAMPLE VII

A. Methyl 3-methylnaphtho-[2.1-b]furan-2-carboxylate

To 155 parts of methyl α-chloroacetoacetate heated to 100° C. there was added in small portions 166 parts of the sodium salt of β-naphthol, the temperature being maintained at 100–115° C. by means of external cooling and by the rate of addition of the sodium β-naphtholate. The reaction mixture was poured onto water, the organic layer was separated and taken up in methylene chloride. Concentration of the methylene chloride solution gave 260 parts of crude methyl α-(β-naphthoxy)acetoacetate which was added slowly to 792 parts of concentrated sulfuric acid at 5–10° C. After stirring for 2 hours at 5–10° C., the reaction mixture was poured onto excess ice and the reaction product was collected. Crystallization of the crude reaction product from methylene chloride-methanol gave colorless crystals of methyl 3-methylnaphtho-[2.1-b]-furan-2-carboxylate melting at 120–122° C.

Analysis:
Calcd. for $C_{15}H_{12}O_3$ _____ C, 74.97; H, 5.04
Found _____ C, 75.30; H, 5.38

B. *Methyl x-chloromethyl-3-methylnaphtho-[2.1-b]-furan-2-carboxylate*

Through a stirred mixture of 72 parts of methyl 3-methylnaphtho-[2.1-b]furan-2-carboxylate, 300 parts of chloroform, 15 parts of paraformaldehyde and 12 parts of zinc chloride was passed dry hydrogen chloride for 1.2 hours, the temperature being maintained at 50° C. The reaction mixture was poured into water and the two layers separated. The organic layer was washed with several changes of water, dried and concentrated. The residue weighed 78 parts.

C. *2-carbomethoxy-3-methyl-x-naphtho-[2.1-b]furaldehyde*

To a solution of 6.9 parts of sodium in 160 parts of methanol there was added 27 parts of 2-nitropropane followed by an addition of 78 parts of crude methyl x-chloromethyl-3-methylnaphtho-[2.1-b]-furan-2-carboxylate. The resulting mixture was refluxed for 1 hour and then most of the methanol was distilled. Working up the residue gave 60 parts of oil which could not be induced to crystallize.

D. *2-carbomethoxy-3-methyl-x-naphtho-[2.1-b]furaldehyde dimethyl acetal*

A mixture of 60 parts of crude 2-carbomethoxy-3-methyl-x-naphtho-[2.1-b]furaldehyde, 50 parts of dimethyl sulfite, 50 parts of methanol and 2 parts of thionyl chloride was refluxed for 18 hours and then the excess methanol and dimethyl sulfite were distilled under reduced pressure. The fraction boiling at 200–210° C. at 1 mm. weighed 22 parts and was the 2-carbomethoxy-3-methyl-x-naphtho-[2.1b]furaldehyde dimethyl acetal.

E. *2-cyanoacetyl-3-methyl-x-naphtho-[2.1-b]-furaldehyde dimethyl acetal*

To a solution of 22 parts of 2-carbomethoxy-3-methyl-x-naphtho-[2.1-b]furaldehyde dimethyl acetal in 50 parts of acetonitrile was added 6 parts of sodium methylate. The resulting reaction mixture was stirred at 75° C. for 2 hours and then diluted with 300 cc. of cold water. The resulting reaction mixture was filtered and the filtrate was acidified with acetic acid. The crude product was collected and crystallized three times from methylene chloride. The colorless crystals of 2-cyanoacetyl - 3 - methyl - x - naphtho - [2.1 - b]furaldehyde dimethyl acetal melted at 170–172° C. with decomposition. The compound has the formula:

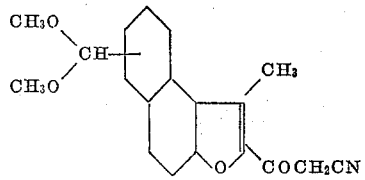

Analysis:
Calcd. for $C_{19}H_{17}O_4N$_____ C, 70.57; H, 5.31; N, 4.34
Found_____ C, 71.07; H, 5.57; N, 4.19, 4.53

F. *2-cyanoacetyl-3-methyl-x-naphtho-[2.1-b]furaldehyde polyvinyl acetal*

A mixture of 5 parts of polyvinyl alcohol, 0.06 part of o-sulfobenzaldehyde sodium salt, 0.15 part of p-toluenesulfonic acid monohydrate, and 40 parts of ethylene glycol was stirred at 70° C. for 5 minutes. A solution of 1.2 parts of 2-cyanoacetyl - 3 - methyl - x - naphtho - [2.1 - b]furaldehyde dimethyl acetal in 4 parts of dioxane was added dropwise during the course of 5 minutes. The reaction mixture was stirred an additional 5 minutes at 70° C. and the colorless polyvinyl acetal was isolated essentially as described in Example I, section E.

G. *Photographic emulsion using 2-cyanoacetyl-3-methyl-x-naphtho-[2.1-b]furaldehyde polyvinyl acetal*

One hundred (100) parts of a 5% solution of 2 - cyanoacetyl - 3 - methyl - x - naphtho - [2.1-b]furaldehyde polyvinyl acetal was prepared essentially as described in Example I, section F. A silver halide emulsion was prepared, coagulated, washed, redispersed and coated on film base essentially as described in Example I, section F. The processed film gave a strong magenta negative dye image.

This invention is generic to the polyhydric alcohol acetals of the formula

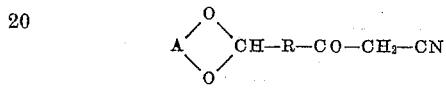

wherein A represents the carbon chain of an aliphatic polyhydric alcohol, e. g., a monomeric or polymeric polyhydric alcohol and R is a divalent radical, aromatic in character, whose terminal atoms are carbon. In addition to the compounds shown in the foregoing examples, other specific acetals which may be mentioned are those in which the cyanoacetylaryl group attached to the aldehyde group is:

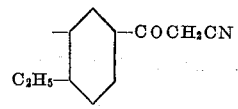

5-cyanoacetyl-2-ethylphenyl

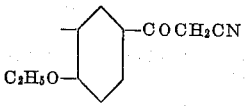

5-cyanoacetyl-2-ethoxyphenyl

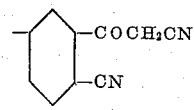

5-cyanoacetyl-4-cyanophenyl

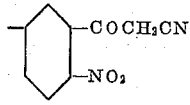

5-cyanoacetyl-4-nitrophenyl

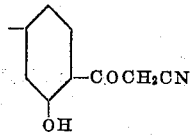

4-cyanoacetyl-3-hydroxyphenyl

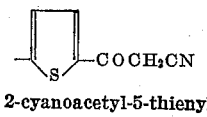

2-cyanoacetyl-5-thienyl

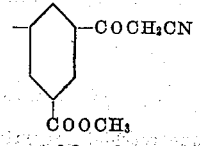

5-cyanoacetyl-3-carbomethoxyphenyl

15

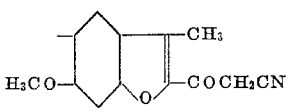
2-cyanoacetyl-3-methyl-6-methoxy-5-benzofuryl

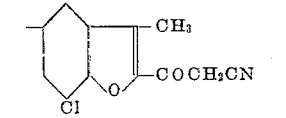
2-cyanoacetyl-3-methyl-7-chloro-5-benzofuryl

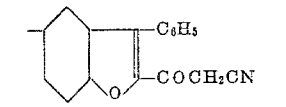
2-cyanoacetyl-3-phenyl-5-benzofuryl

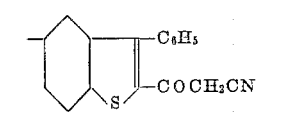
2-cyanoacetyl-3-phenyl-5-thianaphthyl

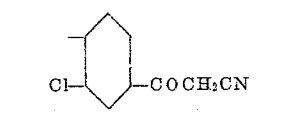
4-cyanoacetyl-2-chlorophenyl

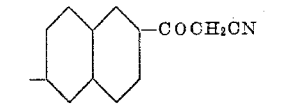
2-cyanoacetyl-6-naphthyl

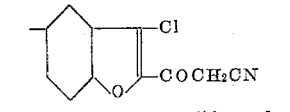
2-cyanoacetyl-3-chloro-5-benzofuryl

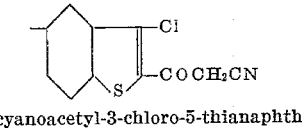
2-cyanoacetyl-3-chloro-5-thianaphthyl

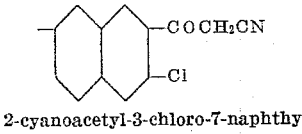
2-cyanoacetyl-3-chloro-7-naphthyl

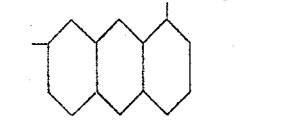
1-cyanoacetyl-7-anthryl

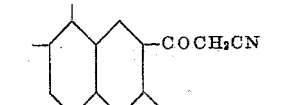
9-cyanoacetyl-1-phenanthryl

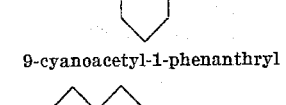
2-cyanoacetyl-5-benzopyridyl

16

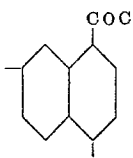
1-cyanoacetyl-4-naphthyl

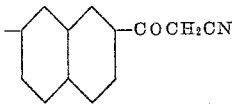
2-cyanoacetyl-4-naphthyl

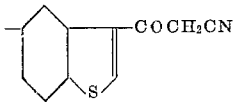
3-cyanoacetyl-5-thianaphthyl

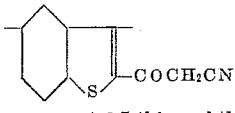
2-cyanoacetyl-5-thianaphthyl

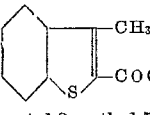
2-cyanoacetyl-3-methyl-5-thianaphthyl

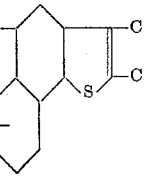
2-cyanoacetyl-3-methyl-6 (or 7, or 8, or 9)-naphtho[1,2-b]thienyl

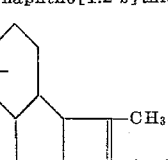
2-cyanoacetyl-3-methyl-6 (or 7, or 8, or 9)-naphtho[2,1-b]thienyl

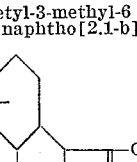
2-cyanoacetyl-3-methyl-6 (or 7, or 8, or 9)-naphtho[2,1-b]furyl

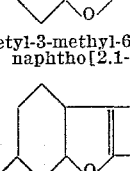
2-cyanoacetyl-3-methyl-6 (or 7, or 8, or 9)-naphtho[1,2-b]furyl 2-cyanoacetyl-5-pyridyl

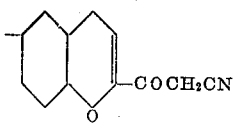
2-cyanoacetyl-6-benzopyryl

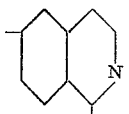
1-cyanoacetyl-6-isoquinolyl

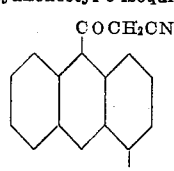
10-cyanoacetyl-1-anthryl

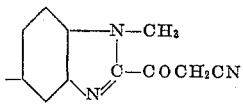
2-cyanoacetyl-3-methyl-6-benzimidazolyl

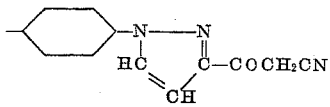
4-(3-cyanoacetylpyrazolyl)-phenyl

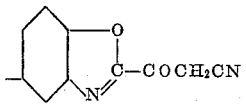
2-cyanoacetyl-5-benzoxazyl

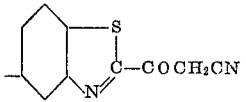
2-cyanoacetyl-5-benzothiazyl

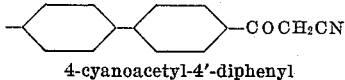
4-cyanoacetyl-4'-diphenyl

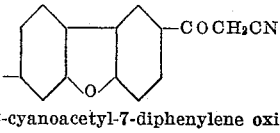
2-cyanoacetyl-7-diphenylene oxide and the like. The nature of the radical R and of its substituents, if any, is largely immaterial provided the radical R is aromatic in character and has a cyanoacetyl group attached thereto, since the latter is the important part of the molecule.

In general, the most useful compounds of this invention are those in which the radical R is a hydrocarbon nuclear structure, aromatic in character, or a heterocyclic nuclear structure, aromatic in character, containing at least one oxygen, sulfur, or nitrogen atom in the ring configuration, the remainder of the nuclear structure being carbon and hydrogen. Especially desirable are color-formers which contain a heterocyclic nucleus with the cyanoacetyl group attached to a carbon atom which is in turn attached to at least one oxygen, sulfur or nitrogen atom in the ring configuration. These color-formers have been found to give the most nearly ideal magenta dyes for the three-color subtractive process.

The alcohol portion of the acetal molecule may be any desired polyhydric alcohol. When it is monomeric, it is preferably a dihydric or trihydric aliphatic alcohol of two to four carbon atoms, e. g., ethylene glycol, glycerol, propylene glycol or butylene glycol, and still more preferably an alkanediol of 2 to 4 carbon atoms. When it is polymeric, it may be any completely or partially hydrolyzed polymer of a vinyl carboxylate, particularly a vinyl ester of a monocarboxylic acid of one to four carbons, e. g., vinyl formate, vinyl acetate, vinyl chloroacetate, vinyl propionate, vinyl butyrate, etc. The vinyl carboxylate should be sufficiently hydrolyzed so that the groups —$CH_2$—CHOH— represent at least 50% of the polymer chain, i. e., for every 100 chain atoms there are at least 25 hydroxyl groups. Hydrolyzed interpolymers of vinyl esters with minor proportions (10% or less by weight) of other polymerizable vinyl compounds, e. g., vinyl chloride, methyl methacrylate, etc., may be used, especially when a lower degree of water solubility is desired. In particular, the water-soluble hydrolyzed olefin/vinyl ester interpolymers and especially the hydrolyzed ethylene/vinyl acetate interpolymers described in U. S. Patents 2,386,347 and 2,397,866 are useful. The preferred polyhydric alcohol is polyvinyl alcohol, and in particular the polyvinyl alcohols ranging in viscosity from 5 to 50 centipoises in 4% aqueous solution at 20° C.

In the polyvinyl acetals of this invention, it is preferred that between 0.75% and 10%, and still more preferably between 0.75% and 7.5%, of the hydroxyl groups of the polyvinyl alcohol be acetalized with the cyanoacetylaryl aldehyde. Below 0.75% acetalization, there are insufficient color-forming groups present to give sufficient color strength in a photographic color film. When more than 10% of the hydroxyl groups of the polyvinyl alcohol are acetalized, the permeability of the layer to the various solutions used to process the photographic film becomes too low for practical application. The polyvinyl acetals falling within the above-defined range are outstanding with respect to top color density, light stability and spectral characteristics in the magenta range on color development with p-aminodiethylaniline type developers. These polymeric compounds are amorphous, high-molecular weight solids which are insoluble in dilute aqueous sodium hydroxide and hot water but are soluble in 10–40% aqueous ethanol.

As illustrated in the examples, an advantageous modification of the invention is obtained when acidic salt-forming groups are introduced into the polymeric acetal by reaction of the polyvinyl alcohol or partial polyvinyl acetal with aldehydes containing carboxylic or sulfonic acid groups. In addition to the o-sulfobenzaldehyde of the examples, which is the preferred aldehydoacid, suitable compounds include phthalaldehydic acid, glyoxalic acid, and propionaldehyde beta-sulfonic acid. Desirably, from 0.1% to 5% of the hydroxyl groups in the polyvinyl alcohol are acetalized with the aldehydoacid. The final compounds need not be used in the form of the free acids as their alkali metal, ammonium and amine salts and especially the sodium salts are very effective.

The acetals of this invention may be added to gelatin or other colloid silver halide emulsions as color-formers. The polyvinyl acetals find use as the sole binders for light-sensitive silver halides for photographic color films. They are resistant to bacterial putrefaction and mold and can be stored for longer periods of time under adverse conditions than the conventional gelatin emulsions.

The invention also includes as an important aspect the photographic silver halide emulsions containing the cyanoacetylaryl acetals together with the conventional ingredients which may be present in such compositions, such as sensitizing dyes and the like.

As many widely different embodiments of this invention can be made without departing from the spirit and scope thereof, it is to be understood that the invention is not to be limited except as defined by the claims.

What is claimed is:

1. A mixed 2-cyanoacetyl-3-phenyl-5-benzofuraldehyde acetal, sodium o-sulfobenzaldehyde acetal of polyvinyl alcohol containing intralinear

 groups

2. A mixed 2-cyanoacetyl-3-methyl-5-benzofuraldehyde acetal, sodium o-sulfobenzaldehyde acetal of polyvinyl alcohol containing intralinear

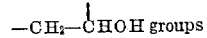 groups

3. A mixed 5-cyanoacetyl-2-furaldehyde acetal, sodium o-sulfobenzaldehyde acetal of polyvinyl alcohol containing intralinear

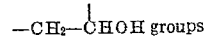 groups

4. Acetals of the formula:

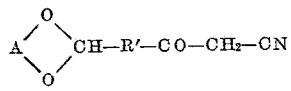

wherein A is the residue of an aliphatic polyhydric alcohol, the carbon atoms of the carbon chain of said alcohol that are attached to the >CH— group being not more than one carbon atom apart in said chain and R' is a divalent cyclic radical having a ring selected from the group consisting of (a) a furane ring and (b) an aromatic carbocyclic ring fused to a furane ring, the free valences of the radical which are attached to radicals >CH— and —CO— being on cyclic carbon atoms, said radicals >CH— and —CO— being joined solely through atoms in said ring, the radical CN—CH₂—CO— joined to R' being the sole cyanoacetyl group in the acetals.

5. Monomeric acetals of the formula:

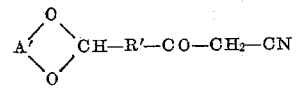

wherein A' is the carbon chain of an alkanediol, the carbon atoms of which attached to the oxygen atoms are not more than one carbon atom apart in said chain and R' is a divalent cyclic radical having a ring selected from the group consisting of (a) a furane ring and (b) an aromatic carbocyclic ring fused to a furane ring, the free valences of the radical which are attached to radicals >CH— and —CO— being on cyclic carbon atoms, said radicals >CH— and —CO— being joined solely through atoms in said ring.

6. Monomeric acetals of the formula:

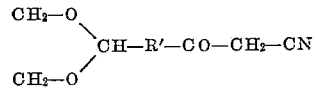

wherein R' is a divalent cyclic radical having a ring selected from the group consisting of (a) a furane ring and (b) an aromatic carbocyclic ring fused to a furane ring, the free valences of the radical which are attached to radicals >CH— and —CO— being on cyclic carbon atoms, said radicals >CH— and —CO— being joined solely through atoms in said ring.

7. Polymeric acetals containing a large number of recurring intralinear

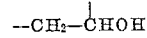

groups and a number of intralinear units of the formula:

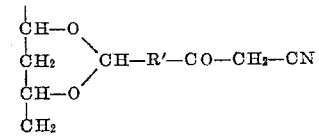

wherein R' is a divalent cyclic radical having a ring selected from the group consisting of (a) a furane ring and (b) an aromatic carbocyclic ring fused to a furane ring, the free valences of the radical which are attached to radicals >CH— and —CO— being on cyclic carbon atoms, said radicals >CH— and —CO— being joined solely through atoms in said ring, the radical

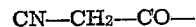

joined to R' being the sole cyanoacetyl group in the acetals.

References Cited in the file of this patent

UNITED STATES PATENTS

| Number | Name | Date |
|---|---|---|
| 2,099,297 | Clement | Nov. 16, 1937 |
| 2,184,310 | Meigs et al. | Dec. 26, 1939 |
| 2,211,323 | Fordyce | Aug. 13, 1940 |
| 2,253,078 | Lowe | Aug. 19, 1941 |
| 2,269,166 | Salo | Jan. 6, 1942 |
| 2,276,305 | Hershberger | Mar. 17, 1942 |
| 2,282,057 | Hopkins et al. | May 5, 1942 |
| 2,310,943 | Dorough et al. | Feb. 16, 1943 |
| 2,320,422 | Frohlich | June 1, 1943 |
| 2,359,332 | Salminen et al. | Oct. 3, 1944 |
| 2,364,675 | Vittum | Dec. 12, 1944 |
| 2,380,033 | Dorough et al. | July 10, 1945 |
| 2,415,381 | Woodward | Feb. 4, 1947 |
| 2,596,755 | Young | May 17, 1952 |

OTHER REFERENCES

McQueen et al.: Journal American Chem. Soc., vol. 73, page 4930, October 1951.